United States Patent
Cordes et al.

(10) Patent No.: US 9,960,985 B2
(45) Date of Patent: May 1, 2018

(54) SYSTEM AND METHOD FOR PROVIDING REDUNDANT ETHERNET NETWORK CONNECTIONS

(71) Applicant: Ciena Corporation, Hanover, MD (US)

(72) Inventors: Corry Alexander Cordes, San Rafael, CA (US); Harsha Vardhan Kovuru, Cotati, CA (US); Balaji Subramaniam, Petaluma, CA (US)

(73) Assignee: Ciena Corporation, Hanover, MD (US)

( * ) Notice: Subject to any disclaimer, the term of this patent is extended or adjusted under 35 U.S.C. 154(b) by 0 days. days.

(21) Appl. No.: 15/349,551

(22) Filed: Nov. 11, 2016

(65) Prior Publication Data

US 2017/0070410 A1    Mar. 9, 2017

Related U.S. Application Data

(63) Continuation of application No. 14/607,600, filed on Jan. 28, 2015, now Pat. No. 9,531,625.

(51) Int. Cl.
  *H04L 12/26* (2006.01)
  *H04L 12/707* (2013.01)
  *H04L 12/24* (2006.01)
  *G06F 3/06* (2006.01)

(52) U.S. Cl.
  CPC .......... *H04L 43/0876* (2013.01); *G06F 3/067* (2013.01); *H04L 41/0654* (2013.01); *H04L 43/0847* (2013.01); *H04L 45/22* (2013.01)

(58) Field of Classification Search
  CPC ..... H04L 45/22; H04L 45/28; H04L 43/0811; H04L 41/0654; H04L 41/0663
  See application file for complete search history.

(56) References Cited

U.S. PATENT DOCUMENTS

| | | |
|---|---|---|
| 5,537,416 A | 7/1996 | MacDonald et al. |
| 5,790,778 A | 8/1998 | Bust et al. |
| 6,233,289 B1 | 5/2001 | Fredrickson |
| 6,728,668 B1 | 4/2004 | Kitamom et al. |
| 7,210,069 B2 * | 4/2007 | Kapauan ............ G06F 11/2007 714/43 |
| 7,260,200 B1 * | 8/2007 | Reynolds ................ H04L 69/40 379/207.02 |
| 7,620,775 B1 | 11/2009 | Waxman |
| 7,849,262 B1 | 12/2010 | Glade |

(Continued)

*Primary Examiner* — Ninos Donabed
(74) *Attorney, Agent, or Firm* — Clements Bernard Walker PLLC; Christopher L. Bernard; Lawrence A. Baratta, Jr.

(57) ABSTRACT

A primary and secondary card are coupled to protect and working paths, respectively providing a redundant connection to a node. The primary and secondary cards implement an inter-card path that is a working path for the primary card and a protect path for the secondary card. Responsive to a fault in the working path, the secondary card generates a simulated error condition on the inter-card path, causing the primary card to make the protect path the active path. When the protect path is the active path and goes down, the primary card generates a simulated error condition on the inter-card path, causing the secondary card to make the working path the active path. Switching of packets to the active and protect paths on the primary and secondary cards and is performed by an FPGA that maintains its own state machine subject to instructions from software executed by the cards.

17 Claims, 12 Drawing Sheets

(56) References Cited

U.S. PATENT DOCUMENTS

| | | |
|---|---|---|
| 8,219,681 B1 | 7/2012 | Glade et al. |
| 8,345,542 B2 * | 1/2013 | Sultan ................. H04L 12/4625 370/216 |
| 8,650,447 B1 | 2/2014 | Wortman et al. |
| 8,718,167 B2 * | 5/2014 | Yeh ...................... H04B 7/0452 370/328 |
| 9,565,083 B2 * | 2/2017 | Belanger ................ H04L 43/08 |
| 2004/0216008 A1 | 10/2004 | Roesner et al. |
| 2004/0225820 A1 | 11/2004 | Adkisson et al. |
| 2005/0149837 A1 | 7/2005 | Jain |
| 2006/0200708 A1 | 9/2006 | Gentieu et al. |
| 2006/0273819 A1 | 12/2006 | Opperman et al. |
| 2007/0165845 A1 | 7/2007 | Ye et al. |
| 2008/0007355 A1 * | 1/2008 | Nakashima ............. H03K 3/00 331/57 |
| 2009/0052594 A1 | 2/2009 | Li et al. |
| 2009/0161562 A1 * | 6/2009 | Shah ....................... H04L 43/10 370/245 |
| 2009/0172529 A1 | 7/2009 | Jas et al. |
| 2009/0193296 A1 | 7/2009 | Kellington et al. |
| 2009/0240986 A1 * | 9/2009 | Warren ................. G06F 11/263 714/32 |
| 2010/0172238 A1 * | 7/2010 | Saltsidis ................ H04L 41/06 370/228 |
| 2010/0198799 A1 * | 8/2010 | Krishnan ............ G06F 11/3696 707/702 |
| 2010/0220730 A1 * | 9/2010 | Finn .................... H04L 12/4625 370/395.1 |
| 2010/0316145 A1 * | 12/2010 | Yeh ...................... H04B 7/0452 375/260 |
| 2011/0096670 A1 * | 4/2011 | Cheng ................. H04L 12/4633 370/241.1 |
| 2012/0020206 A1 * | 1/2012 | Busi ........................ H04L 41/00 370/217 |
| 2012/0033546 A1 * | 2/2012 | Joshi ................... H04L 43/0811 370/225 |
| 2012/0033547 A1 * | 2/2012 | Joshi ................... G06F 11/2005 370/225 |
| 2012/0033549 A1 * | 2/2012 | Joshi ................... H04L 41/0663 370/228 |
| 2012/0144244 A1 | 6/2012 | Dan et al. |
| 2013/0121164 A1 * | 5/2013 | Shabtay ............... H04L 12/4641 370/241.1 |
| 2013/0201912 A1 * | 8/2013 | Sheng .................. H04B 7/0413 370/328 |
| 2013/0346799 A1 * | 12/2013 | Warren ................ G06F 11/263 714/28 |
| 2014/0088755 A1 * | 3/2014 | Haga ................... G05B 19/408 700/190 |
| 2014/0241144 A1 * | 8/2014 | Kashyap ............... H04L 47/365 370/216 |
| 2015/0271104 A1 * | 9/2015 | Chikkamath ....... H04L 12/4633 370/401 |
| 2015/0326210 A1 | 11/2015 | Beerel et al. |

* cited by examiner

560

700

SYSTEM AND METHOD FOR PROVIDING REDUNDANT ETHERNET NETWORK CONNECTIONS

CROSS-REFERENCE TO RELATED APPLICATION(S)

The present patent application/patent is a continuation of U.S. patent application Ser. No. 14/607,600, filed on Jan. 28, 2015, and entitled "SYSTEM AND METHOD FOR PROVIDING REDUNDANT NETWORK CONNECTIONS," the contents of which are incorporated in full by reference herein.

BACKGROUND

Field of the Invention

This invention relates to systems and methods for providing redundant network connections.

Background of the Invention

The G.8031 Ethernet linear protection switching protocol (International Telecommunication Union Document Numbers G.8031/Y.1342 (June 2011), G.8031/Y.1342 (2011) Corrigendum 1 (February 2012), and G.8031/Y.1342 (2011) Amendment 1 (August 2013), which are incorporated herein by reference) provides for very fast switching between working and protect paths that both terminate at ports of the same card or other network card or node in order to provide a redundant network connection. Specifically, the G.8031 standard defines a state machine that selects one of the working and protect paths as the active path based on statuses of the working and protect paths.

This application is directed to an improved approach for providing rapid switching between working and protect paths using separate networking devices, e.g. separate cards slotted in the same or different chassis.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

Figure 1:
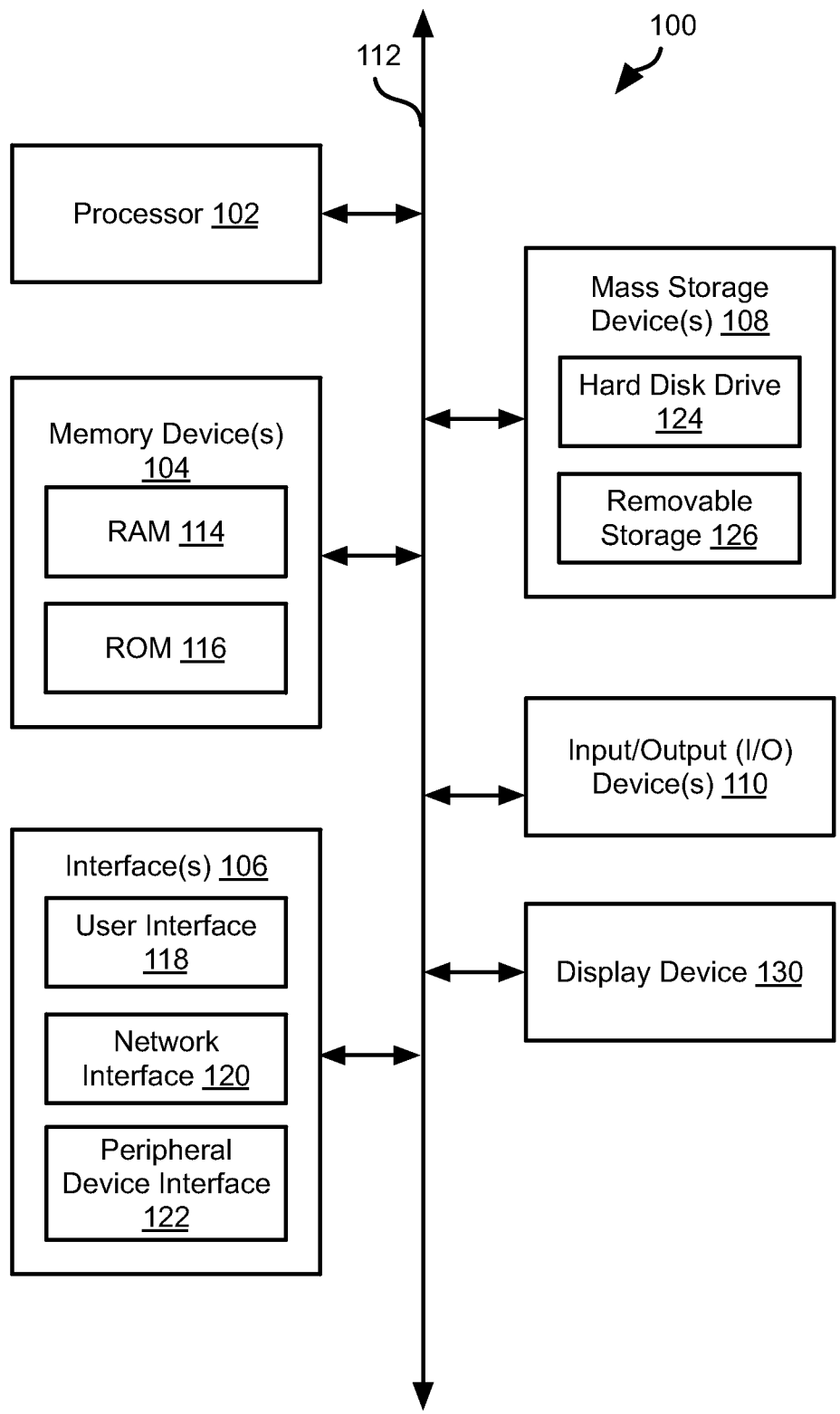
FIG. 1 is a schematic block diagram of a computer system suitable for implementing methods in accordance with embodiments of the invention.

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

The invention has been developed in response to the present state of the art and, in particular, in response to the problems and needs in the art that have not yet been fully solved by currently available apparatus and methods. Accordingly, the invention has been developed to provide apparatus and methods for visualizing a network spanning a large geographical area.

Embodiments in accordance with the present invention may be embodied as an apparatus, method, or computer program product. Accordingly, the present invention may take the form of an entirely hardware embodiment, an entirely software embodiment (including firmware, resident software, micro-code, etc.), or an embodiment combining software and hardware aspects that may all generally be referred to herein as a "module" or "system." Furthermore, the present invention may take the form of a computer program product embodied in any tangible medium of expression having computer-usable program code embodied in the medium.

Any combination of one or more computer-usable or computer-readable media may be utilized. For example, a computer-readable medium may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. In selected embodiments, a computer-readable medium may comprise any non-transitory medium that can contain, store, communicate, propagate, or transport the program for use by or in connection with the instruction execution system, apparatus, or device.

Computer program code for carrying out operations of the present invention may be written in any combination of one or more programming languages, including an object-oriented programming language such as Java, Smalltalk, C++, or the like and conventional procedural programming languages, such as the "C" programming language or similar programming languages. The program code may execute entirely on a computer system as a stand-alone software package, on a stand-alone hardware unit, partly on a remote computer spaced some distance from the computer, or entirely on a remote computer or server. In the latter scenario, the remote computer may be connected to the computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions or code. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a non-transitory computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

FIG. 1 is a block diagram illustrating an example computing device 100. Computing device 100 may be used to perform various procedures, such as those discussed herein. Computing device 100 can function as a server, a client, or any other computing entity. Computing device can perform various monitoring functions as discussed herein, and can execute one or more application programs, such as the application programs described herein. Computing device 100 can be any of a wide variety of computing devices, such as a desktop computer, a notebook computer, a server computer, a handheld computer, tablet computer and the like.

Computing device 100 includes one or more processor(s) 102, one or more memory device(s) 104, one or more interface(s) 106, one or more mass storage device(s) 108, one or more Input/Output (I/O) device(s) 110, and a display device 130 all of which are coupled to a bus 112. Processor(s) 102 include one or more processors or controllers that execute instructions stored in memory device(s) 104 and/or mass storage device(s) 108. Processor(s) 102 may also include various types of computer-readable media, such as cache memory.

Memory device(s) 104 include various computer-readable media, such as volatile memory (e.g., random access memory (RAM) 114) and/or nonvolatile memory (e.g., read-only memory (ROM) 116). Memory device(s) 104 may also include rewritable ROM, such as Flash memory.

Mass storage device(s) 108 include various computer readable media, such as magnetic tapes, magnetic disks, optical disks, solid-state memory (e.g., Flash memory), and so forth. As shown in FIG. 1, a particular mass storage device is a hard disk drive 124. Various drives may also be included in mass storage device(s) 108 to enable reading from and/or writing to the various computer readable media. Mass storage device(s) 108 include removable media 126 and/or non-removable media.

I/O device(s) 110 include various devices that allow data and/or other information to be input to or retrieved from computing device 100. Example I/O device(s) 110 include cursor control devices, keyboards, keypads, microphones, monitors or other display devices, speakers, printers, network interface cards, modems, lenses, CCDs or other image capture devices, and the like.

Display device 130 includes any type of device capable of displaying information to one or more users of computing device 100. Examples of display device 130 include a monitor, display terminal, video projection device, and the like.

Interface(s) 106 include various interfaces that allow computing device 100 to interact with other systems, devices, or computing environments. Example interface(s) 106 include any number of different network interfaces 120, such as interfaces to local area networks (LANs), wide area networks (WANs), wireless networks, and the Internet. Other interface(s) include user interface 118 and peripheral device interface 122. The interface(s) 106 may also include one or more user interface elements 118. The interface(s) 106 may also include one or more peripheral interfaces such as interfaces for printers, pointing devices (mice, track pad, etc.), keyboards, and the like.

Bus 112 allows processor(s) 102, memory device(s) 104, interface(s) 106, mass storage device(s) 108, and I/O device(s) 110 to communicate with one another, as well as other devices or components coupled to bus 112. Bus 112 represents one or more of several types of bus structures, such as a system bus, PCI bus, IEEE 1394 bus, USB bus, and so forth.

For purposes of illustration, programs and other executable program components are shown herein as discrete blocks, although it is understood that such programs and components may reside at various times in different storage components of computing device 100, and are executed by processor(s) 102. Alternatively, the systems and procedures described herein can be implemented in hardware, or a combination of hardware, software, and/or firmware. For example, one or more application specific integrated circuits (ASICs) can be programmed to carry out one or more of the systems and procedures described herein.

Figure 2:
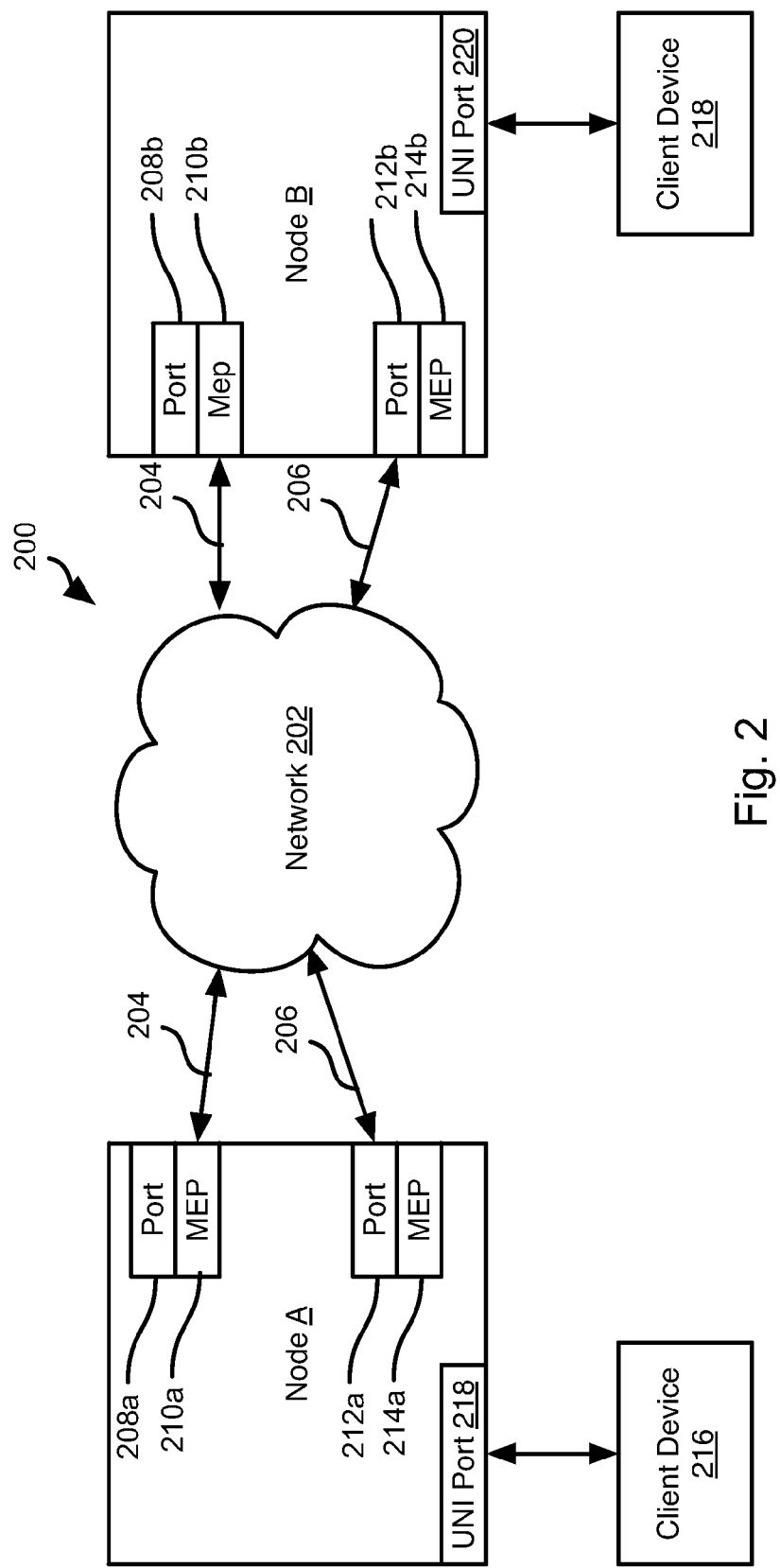
FIG. 2 is schematic block diagram of a network environment suitable for visualization in accordance with embodiments of the present invention.

FIG. 2 illustrates an example network environment 200 that may be visualized according to the methods disclosed herein. The network environment may include a plurality of network nodes, each of which may have some or all of the attributes of a computer system 200 and may execute software implementing one or more network services accessible to other nodes of the plurality of nodes or by client computer systems in data communications with nodes of the plurality of nodes.

For example node A and node B may be coupled to one another through a network 202 such that a protect path 204 and working path 206 are defined between the nodes A, B. The protect path 204 and working path 206 may be bi-directional paths and at least a portion thereof include separate physical cables and/or separate wireless communication channels. The protect path 204 and working path 206 may be routed through separate devices within the network 202 and portions of one or both of the protect path 204 and working path 206 may include redundant paths within the network 202 according to any protocol known in the art or according to the systems and methods disclosed herein.

Node A may define a protect port 208a coupled to the protect path 204. The protect port 208a may have a corresponding protect maintenance end point (MEP) 210a that is a hardware or software module that monitors the status of the protect port 208a and protect path 204.

Node A may define a working port 212a coupled to the working path 206. The working port 212a may have a corresponding working MEP 214a that is a hardware or software module that monitors the status of the working port 212a and working path 206.

Node B defines a corresponding protect port 208b coupled to the protect path 204, protect MEP 210b monitoring the protect port 208b and protect path 204, working port 212b coupled to the working path 206, and a working MEP 214b monitoring the working port 210b and working path 206.

The ports 208a, 208b, 212a, 212b may each be associated with a different physical port and may each be part of a separate network card, network adapter, or other networking device.

Nodes A and B may communicate with client devices 216, 218, respectively such that traffic between these devices 216, 218 is routed through one of the protect path 204 and working path 206. As described in greater detail below, only one of the protect path 204 and working paths 206 is active at a time such that traffic between the devices is transmitted on whichever is the active path.

As shown, node A may define UNI (user network interface) port 218 in the same card as one of the ports 208a, 212a or a different card. The UNI port 218 may be a physical port to which the client device 216 is coupled and traffic from which ever of the paths 204, 206 is active is routed to the UNI port 218. Likewise traffic received at the UNI port 218 is routed over which ever of the paths 204, 206 is active.

Node B likewise defines a corresponding UNI port 220 coupled to the client device 218 and defined on the same card as one of the ports 208b, 212b or a different card. Traffic received from whichever of the paths 204, 206 is active is then routed to the UNI port 220 and traffic received at the UNI port 220 is routed over whichever of the paths 204, 206 is active.

Figure 3:
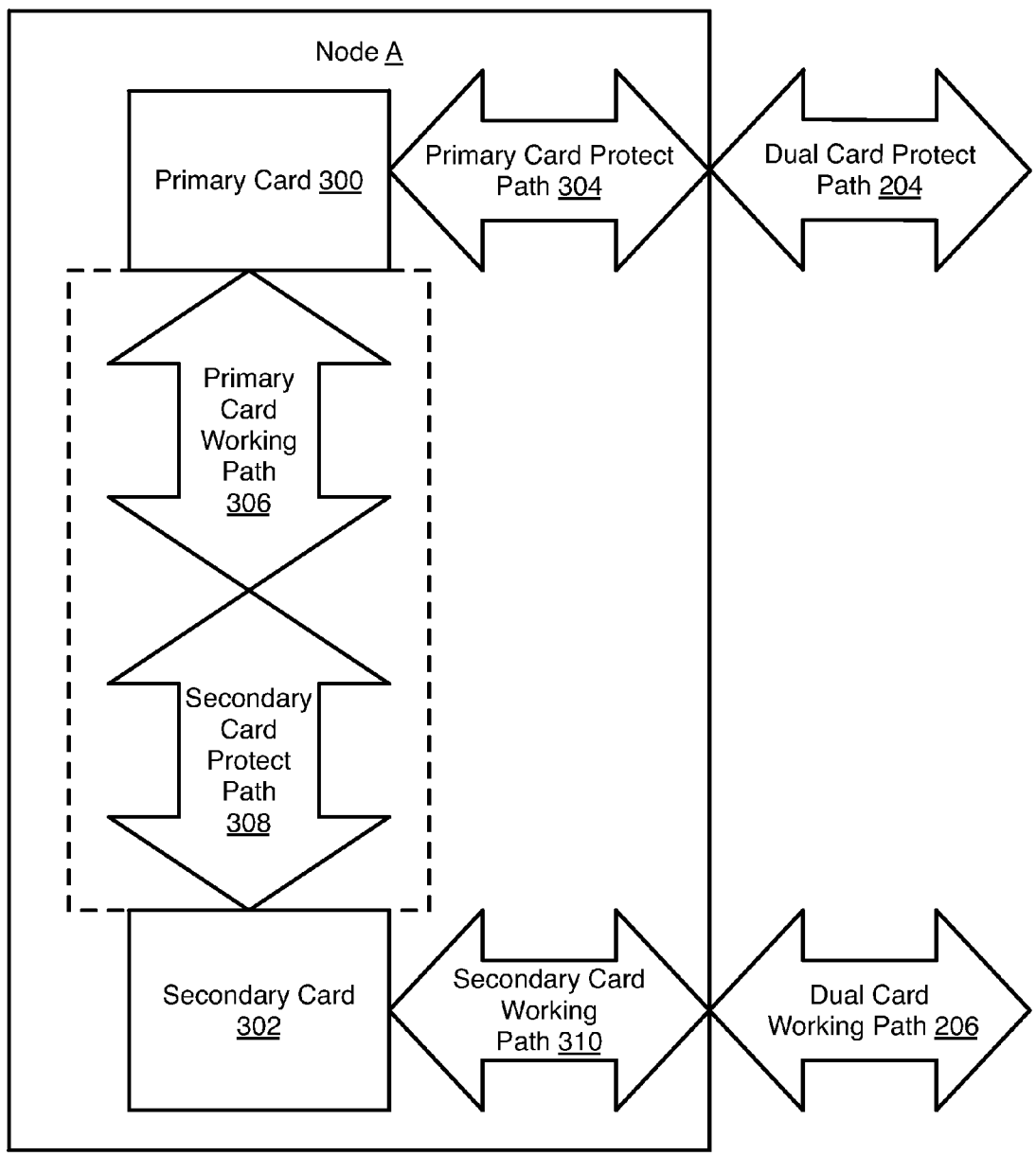
FIG. 3 is a schematic diagram of paths defined within a node and coupled to a node in accordance with an embodiment of the present invention.

FIG. 3 illustrates the general architecture of a node. Although FIG. 3 is shown as node A, node B may be identically configured. Node A may be a chassis having a backplane and one or more cards slotted into the backplane. In particular, node A may have at least a primary card 300 and a secondary card 302. For purposes of this disclosure, the primary card 300 and secondary card 302 are described as being slotted in to the same chassis of node A. However, the methods disclosed herein may be implemented in the same manner for a primary card 300 and secondary card 302 that are located within different chassis.

The primary card 300 defines the protect port 208a and the network connection to the protect port 208a is designated as the protect path 304 for that primary card 300. As is apparent from FIG. 2, the protect path 304 for the primary card 300 is also the protect path 204 for node A, i.e. the protect path for the redundant network connection defined by node A.

The primary card 300 further defines a primary card working path 306 that is identical to or coupled to the secondary card protect path 308 of the secondary card 302. Where the primary card 300 and secondary card 302 are slotted into the same chassis, the primary card working path 306 and secondary card protect path 308 may be implemented by an inter-card path defined by the backplane to which the cards 300, 302 are coupled. In particular, the cards 300, 302 may define virtual ports that are coupled to one another through the back plane in order to defined the primary card working path 306 and secondary card protect path 308.

The secondary card 302 defines a secondary card working path 310 that is the same path as the dual card working path 206, i.e. the port 212b is defined by the secondary card 302 such that the dual card working path 206 corresponds to the working path 310 of the secondary card 302.

Figure 4:
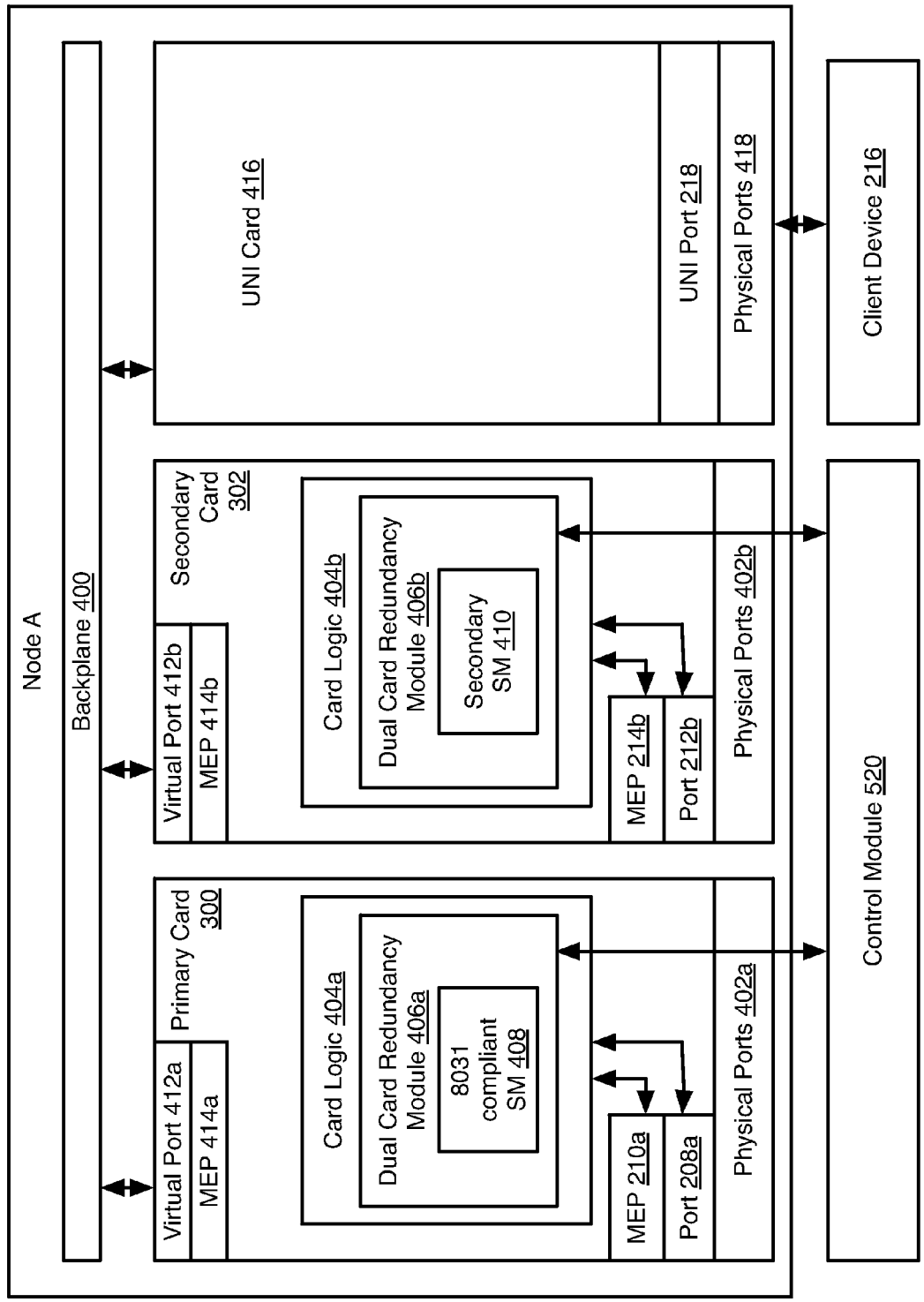
FIG. 4 is a schematic diagram of a components of a node in accordance with an embodiment of the present invention.

FIG. 4 is a more detailed schematic representation of node A. As noted above, node B may be identically configured. Node A includes backplane 400 that may be embodied as a simple bus or as a computing device having some or all of the attributes of the computing device 100. In particular, the backplane 400 may implement routing rules for routing traffic among the cards slotted therein.

The primary card 300 and secondary card 302 may define physical ports 402a, 402b that may implement functionality required to translate electrical or optical signals received therein to binary data. Ports 208a, 212b may be logical ports that are addressed by data decoded on the physical ports. Specifically, ports 208a, 212b may be represented by a port number such that data packets referencing that port number are associated to that port 208a, 212a.

Data received on the ports 208a, 212b may be processed by corresponding card logic 404a, 404b. The card logic 404a, 404b may implement dual node redundancy logic 406a, 406b implementing methods described below for managing traffic received on the protect path 204 and working path 206 and ensuring that only one of these paths 204, 206 is active at a time. The card logic 404a, 404b may be implemented as field programmable gate arrays, software executed by a processor include in the cards 300, 302, application specific integrated circuits (ASIC), or the like. As will be described in greater detail below, the dual card redundancy module 406a may include a state machine 408 that defines states and state transitions conforming to the G.8031 standard. Dual card redundancy module 406b likewise defines a secondary state machine 410 that implements states and state transitions as described below responsive to commands received from the dual card redundancy module 406a.

The primary card 300 and secondary card 302 may define virtual ports 412a, 412b and corresponding MEPs 414a-414b that are coupled to one another through the backplane 400 in order to implement an inter-card path that is both the working path 306 of the primary card 300 and the protect path 308 of the secondary card 302 as described above with respect to FIG. 3. As noted above, the methods described herein may be performed in an identical manner for cards 300, 302 that are not slotted in the same chassis. In such embodiments, the virtual ports 412a, 412b may be embodied as logical ports associated with actual physical ports and the inter-card connection may be embodied as any network connection between these ports, e.g. a wired, fiber optic, or wireless connection between the physical ports.

A UNI card 416 may be slotted in the node A and coupled to the backplane 400. The backplane and dual card redundancy modules 406a, 406b may be configured to route traffic from the active path of the protect and working paths 204, 206 to the UNI card 416, which defines the UNI port 218 associated with a physical port 418 to which the client device is connected. Likewise, traffic from the client device 216 is routed by the UNI card 416 and backplane 400 to which ever of the cards 300, 302 is coupled to the active path of the protect and working paths 204, 206.

In some embodiments, the dual card redundancy modules 406a, 406b instruct the backplane 400 to route traffic to and from the UNI port 218 in response to switching of the active path between the protect and working paths 204, 206 according to the methods described below. In some embodiments, the UNI port 218 is defined by one of the primary card 300 and secondary card 302 such that the client device 216 will be coupled to a physical port 402a, 402b of one of the primary card 300 and secondary card 302. The backplane 400 may likewise route traffic to and from the UNI port 218 in a similar manner according to which of the protect and working paths 204, 206 is made active according to the methods described below.

A control module 520 may be in data communication with the dual card redundancy modules 406a, 406b and receive reports regarding the states of the state machines 408, 410 and which of the working paths 204, 206 is made active according to the methods described herein. The control module 520 may likewise invoke changes in the state machines 408, 410 in response to operating conditions, such as failure of a backplane 400 or of a card 300, 302. The control module 520 may likewise interface with a remote computer or display device in order to report on the status of the cards 300, 302 and the redundant network connection implemented by the cards 300, 302. The control module 520 may be a card in the same chassis as the cards 300, 302 or a computing device in data communication with the cards 300, 302.

FIGS. 5A through 5F illustrate different actions that may be performed by the dual card redundancy logic 404a, 404b of the primary card 300 and secondary card 302 in response to events and base on current states of the state machines 408, 410.

Figure 5A:
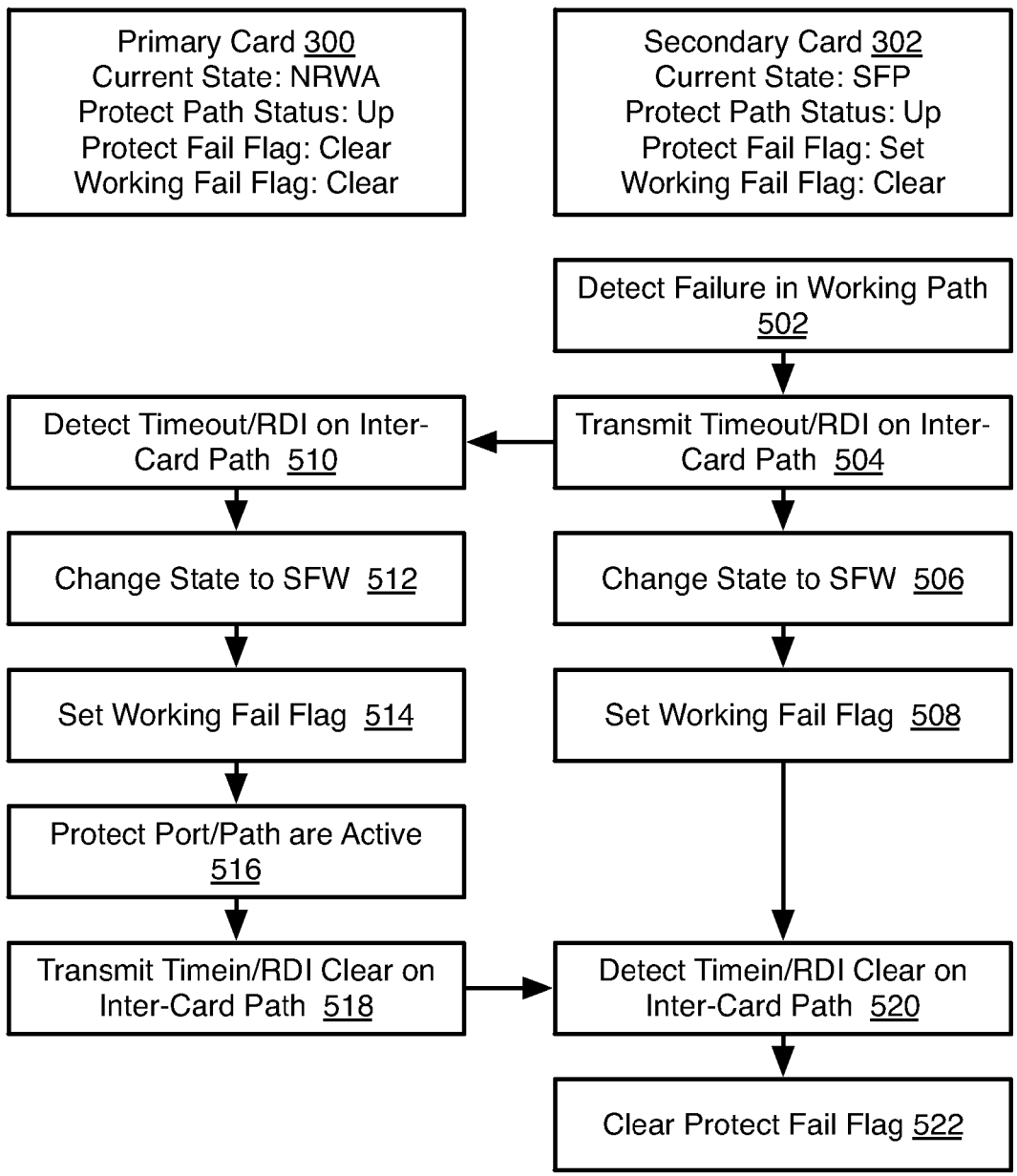
FIGS. 5A-5F are process flow diagrams illustrating transitioning of a node between working and protect paths responsive to failure conditions in accordance with an embodiment of the present invention.

Referring to FIG. 5A, the illustrated method 500 may be performed with the current state of the state machines 408 indicating that both the protect and working paths 204, 206 are up and that the working path 206 is active (NRWA: no request working active). The state machine 408 may further include a protect fail flag and a working fail flag, both of which are cleared.

The state machine 410 may indicate that at least the working path 206 is up (SFP: set fail protect or NRWA) and have a working fail flag cleared. The protect fail flag may bet set notwithstanding the protect path 204 is actually operational due to the manner in which the state of the state machine 410 is changed, as described below.

The method 500 may include detecting 502 failure of the working path 206. Detecting failure may include failing to receive a continuity check message (CCM) during a timeout period from a device coupled to the port 212b, such as the client device 218. Detecting failure may include receiving a CCM with a field indicating that a defect or error has been detected (e.g., a RDI: remote defect indication). Any other failure or means for detecting failure known in the art may be performed at step 502.

In particular, an RDI may be inserted in a CCM packet by setting one or more bits at a particular location that when set are interpreted as indicating failure of the path that is being traversed by the CCM.

In response to detecting 502 failure, the secondary card 302 causes a timeout or RDI to occur on the inter-card path. That is to say, a simulated error condition is invoked on the inter-card path that does not correspond to any actual error on the inter-card path. For example, an RDI may be inserted in a CCM packet transmitted on the inter-card path. It is therefore apparent that the bit locations for setting an RDI are being overloaded according to the embodiments disclosed herein: the RDI is used both for reporting actual errors and for transmitting events and commands on the intercard path. Accordingly, in the subsequent description reference to a simulated error condition may refer to setting the same field of the CCM that is used to indicate a RDI in response to actual errors occur on either of the protect and working paths 204, 206. In response to detecting 502 failure, the secondary card 302 may change 506 the state of the state machine 410 to indicate that the working path has failed (SFW: set fail working) and set 508 the working fail flag.

The primary card 300 may detect 510 the timeout or RDI created on the inter card path and, in response, change 512 the state of state machine 408 to indicate that the working path has failed (SFW) and set the working fail flag. The method 500 may further include setting 516 as active the protect port 208a of the primary card 300 and the protect path 204. For example, routing rules may be propagated to all cards of the node A (e.g. the UNI card 416 in the embodiment of FIG. 4) to indicate that traffic from the client device 216 is to be routed over the protect path 204.

The method 500 may further include transmitting 518 by the primary card 300 over the inter-card path, a timein or RDI clear message indicating that the inter-card path is now operational. Again, the timein or RDI clear message do not correspond to any actual clearing of an error or restoration of operation of the inter-card path but serve as a message to the secondary card 302. In particular, in response to detecting the timein or RDI transmitted at step 518, the secondary card 302 may clear the protect fail flag 522.

Following execution of the method 500, the protect path 204 is active and traffic between the client devices 216, 218 will be routed by the backplane 400, UNI card 416 and/or either of the primary and secondary cards 300, 302 over the protect path 204 and the protect port 208a of the primary card 300.

In response to the transition from the working path 206 to the protect path 204, an APS (automatic protection switching) message may be sent to node B to indicate that the protect path 204 is the active path such that traffic from the client device 218 will then be routed by node B over the protect path 204 and traffic received on the protect path 204 will be routed to the client device 218.

Figure 5B:
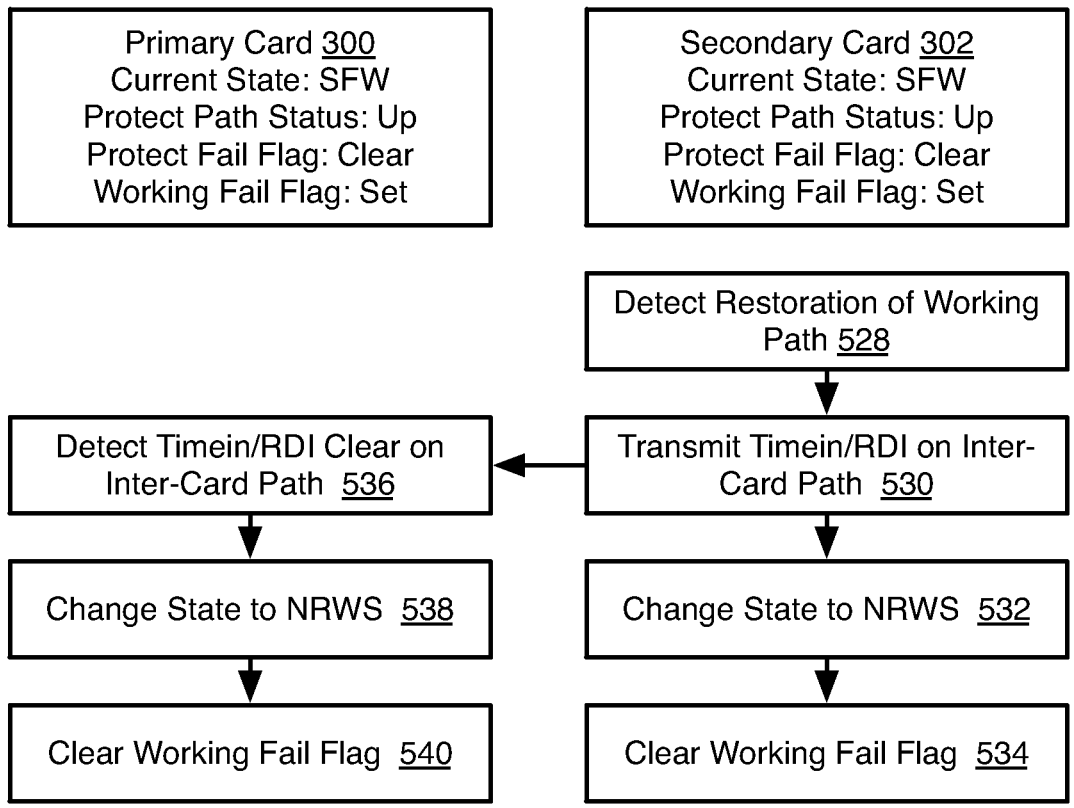

Referring to FIG. 5B, for the primary card 300 and secondary card 302 having the states thereof following execution of the method 500, the illustrated method 526 may be executed. In particular, the method 526 may begin with the state machines 408, 410 both having a state of SFW, the protect fail flag cleared and the working fail flag set.

The method 526 may include detecting 528 by the secondary card 302 restoration of the working path 206 subsequent to the detected failure of the working path 206. The secondary card may invoke transmitting 530 of an RDI clear message or creating a timein event on the inter-card path. Again, the RDI clear message and timein event are simulated such that they do not correspond to any actual clearing of an error or timein event on the inter-card path. The secondary card 302 may further change 532 the state of the state machine 410 to NRWS (no request working standby) thereby indicating that the protect path 204 is the active path and that the working path 206 is up. The secondary card 302 may likewise clear 534 the working fail flag.

The primary card 300 detects 536 the timein or RDI clear message and, in response, changes 538 the state of the state machine 408 to NRWS thereby indicating that the protect path 204 is the active path and that the working path 206 is up. The primary card 302 may further clears 540 the working fail flag 504. The protect path 204 remains the active path as determined according to the method 500.

The method 526 illustrates that the primary card 300 exclusively determines which of the protect path 204 and working path 206 is active. In particular, restoration of the working path 206 will not cause the secondary card 302 to designate the working path as active unless instructed to do so by the primary card 300. Accordingly, messages (simulated error conditions or simulated clearing of error conditions) generated by the secondary card 302 may be viewed as events whereas messages generated by the primary card 300 may be viewed as commands to the secondary card 302 to designate the working path 206 as active or inactive and change the state of the state machine 410 accordingly.

Figure 5C:
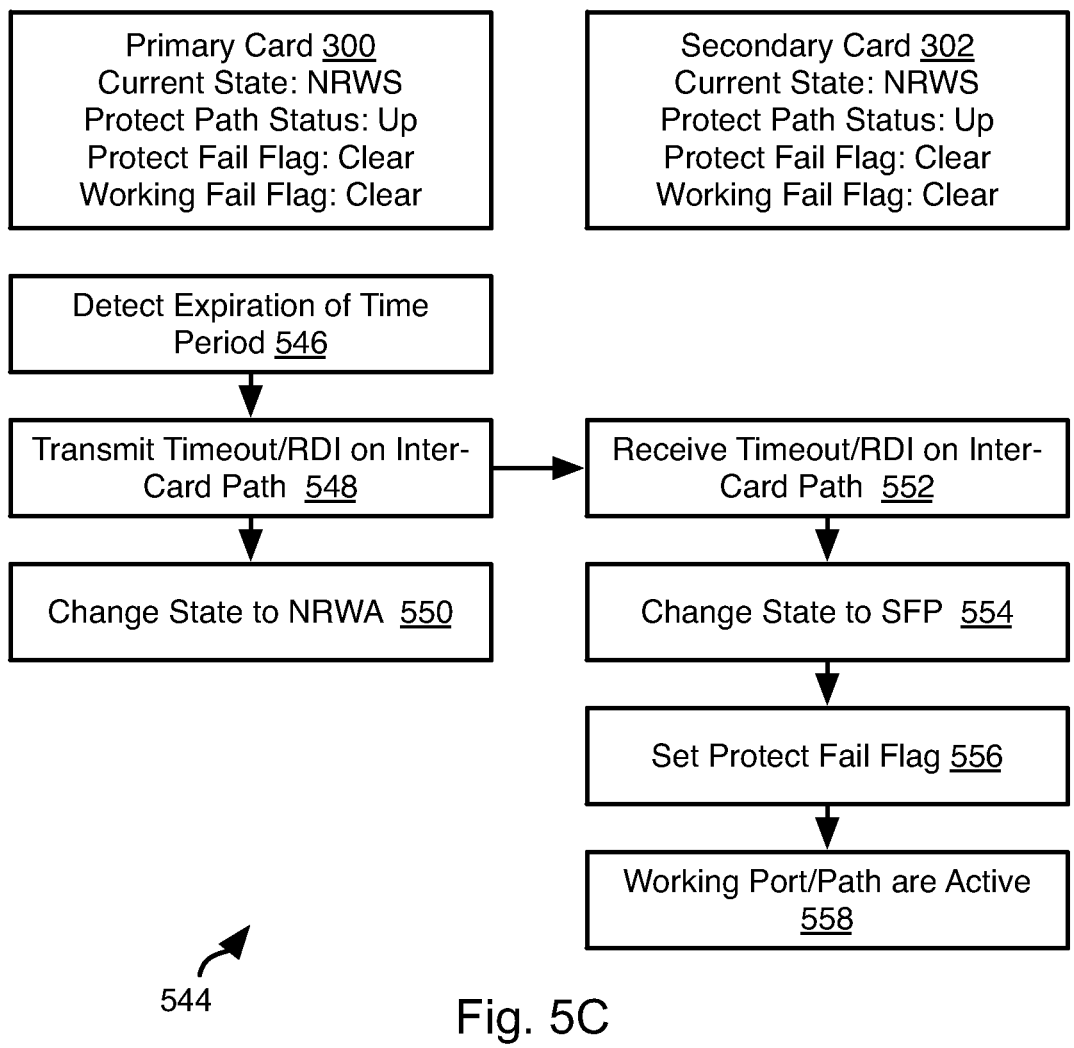

Referring to FIG. 5C, in some embodiments, the working path 206 is the default path. In some embodiments, the working path 206 will be restored as the active path following restoring of functioning of the working path 206 even without a fault in the protect path. For example, in response detecting 546 expiration of a predetermined time period after either of the protect path 204 being active or the working path 206 being detected to be restored to operation, the illustrated method 544 may include transmitting 548 by the primary card 300 a message indicating an error condition on the inter-card path, e.g. creating a timeout event or transmitting an RDI on the inter-card path, the message indicating an error condition not corresponding to any actual error on the inter-card path. Likewise, in response to detecting expiration of the time period, the primary card 300 may change the state of the state machine 408 to NRWA (no request working active) indicating that both the protect path 204 and working path 206 are up and that the working path 206 is active.

In response to receiving 552 the transmitted 548 error message, the secondary card 302 may change its state to SFP (state fail protect) indicating that the protect path 204 has failed and thus the working path 206 should be made active. The secondary card 302 may further set the protect fail flag in response to receiving 552 the error message. The secondary card 302 may likewise set 558 the working path 206 and corresponding port 212b as active in response to receiving 552 the message. As noted above, designating the working path 206 as active may include notifying other cards slotted in the backplane 400 to indicate that traffic to and from the client device 216 is to be routed through the port 212b and over the working path 206. Likewise, step 558 may include transmitting an APS message to the client device 218 indicating that traffic is to be received from and transmitted over the working path 206 and port 212b rather than the protect path 204 and port 208a.

Figure 5D:
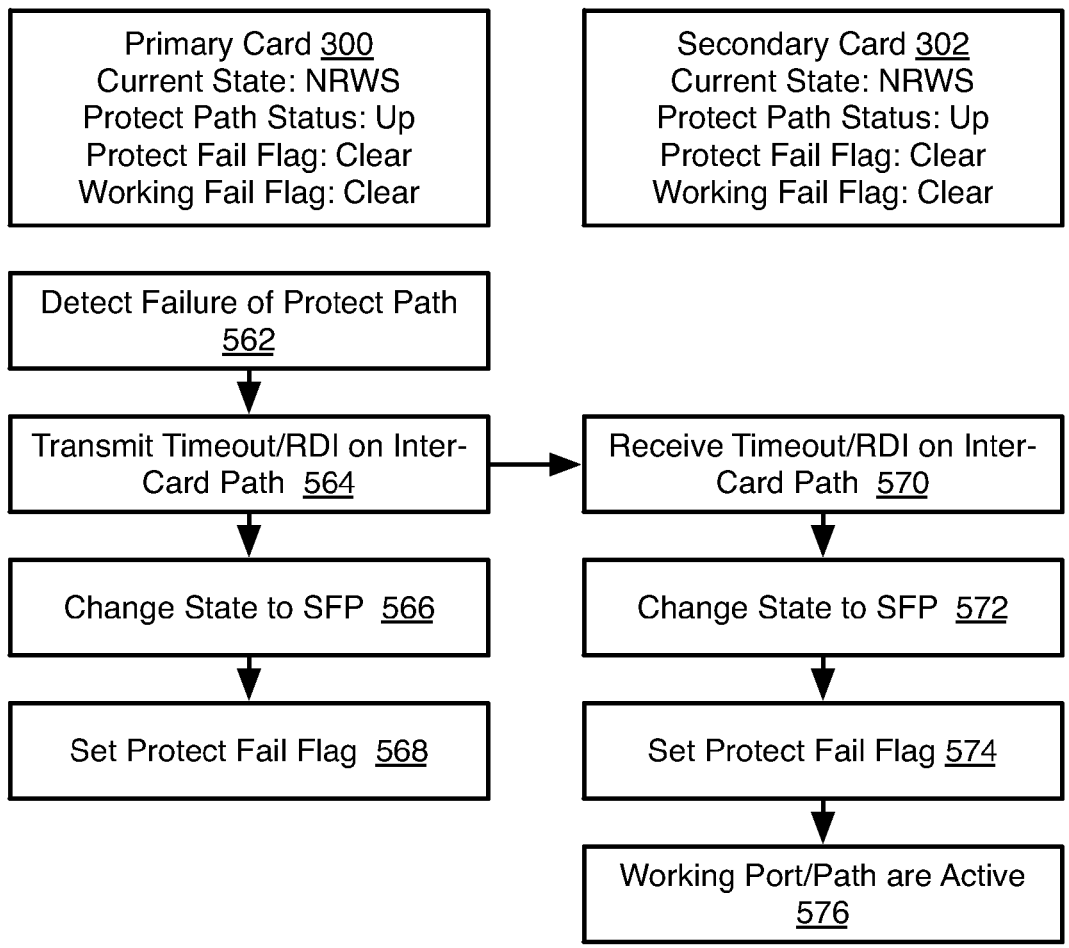

FIG. 5D illustrates a method 560 that is performed by the primary card 300 and secondary card 302 having the illustrated states of the state machines 408, 410. In particular, the illustrated method 560 may be performed when the protect path 204 is the active path and the working path 206 is up but not active (NRWS: no request working standby).

The method 560 may include detecting 562 failure of the protect path 204 and, in response performing steps 564-568. In particular, the method 560 may include transmitting 564 an error message on the inter-card path, such as invoking a timeout event or transmitting an RDI on the inter-card path. Again, the timeout event or RDI do not correspond to any actual error but rather are simulated in order to invoke a change in state by the secondary card 302.

The primary card 300 may further change 566 its state to SFP (state fail protect) thereby indicating that the protect path 204 is not active and is down. The primary card 300 may further set 568 the protect fail flag.

In response to receiving 570 the error message, the secondary card 302 may perform some or all of steps 572-576. For example, the secondary card 302 may change 572 its state to SFP and set 574 the protect fail flag. The secondary card 302 may make 576 the working path 206 and corresponding port 212b are active as described above with respect to step 558 of the method 544.

Figure 5E:
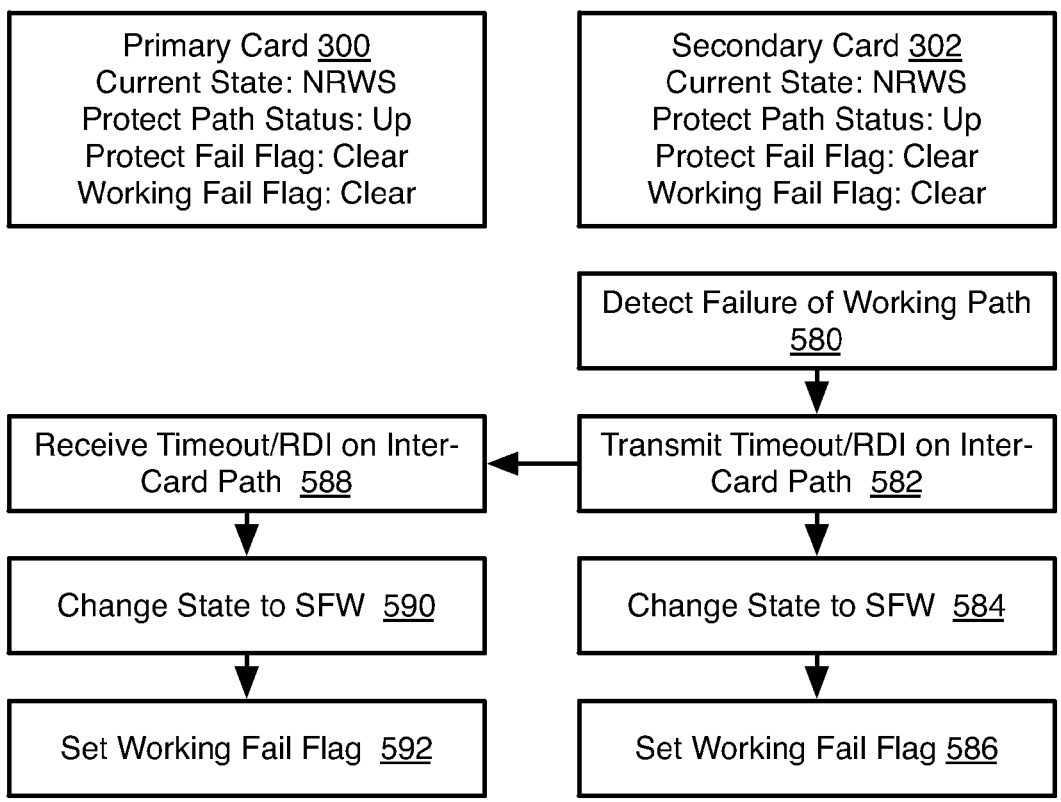

FIG. 5E illustrates a method 570 that may be executed upon failure of the working path 206 when the protect path is active as indicated by the illustrated states for the primary card 300 and secondary card 302. Specifically the state NRWS (no request working standby) indicates that both protect and working paths 204, 206 are up and that the protect path 206 is active.

The method 570 may include detecting 580 failure of the working path 206 by the secondary card 302 and performing, by the secondary card, steps 582-586 in response. The method 580 may include transmitting 582 a simulated error message over the inter-card path as for other methods described herein in the form of a timeout event or RDI message that does not correspond to any actual error on the inter-card path. The secondary card 302 may further change 584 its state to SFW (set fail working) indicating that the protect path 204 is active and that the working path 206 is down. The secondary card 302 may further set 586 the working fail flag.

In response to receiving 588 the transmitted 582 error message, the primary card 300 may change 590 its state to SFW as well and set 592 the working fail flag. As noted above, the secondary card 302 is not able to change which of the paths 204, 206 is active. Accordingly, the protect path 204 remains active.

Figure 5F:
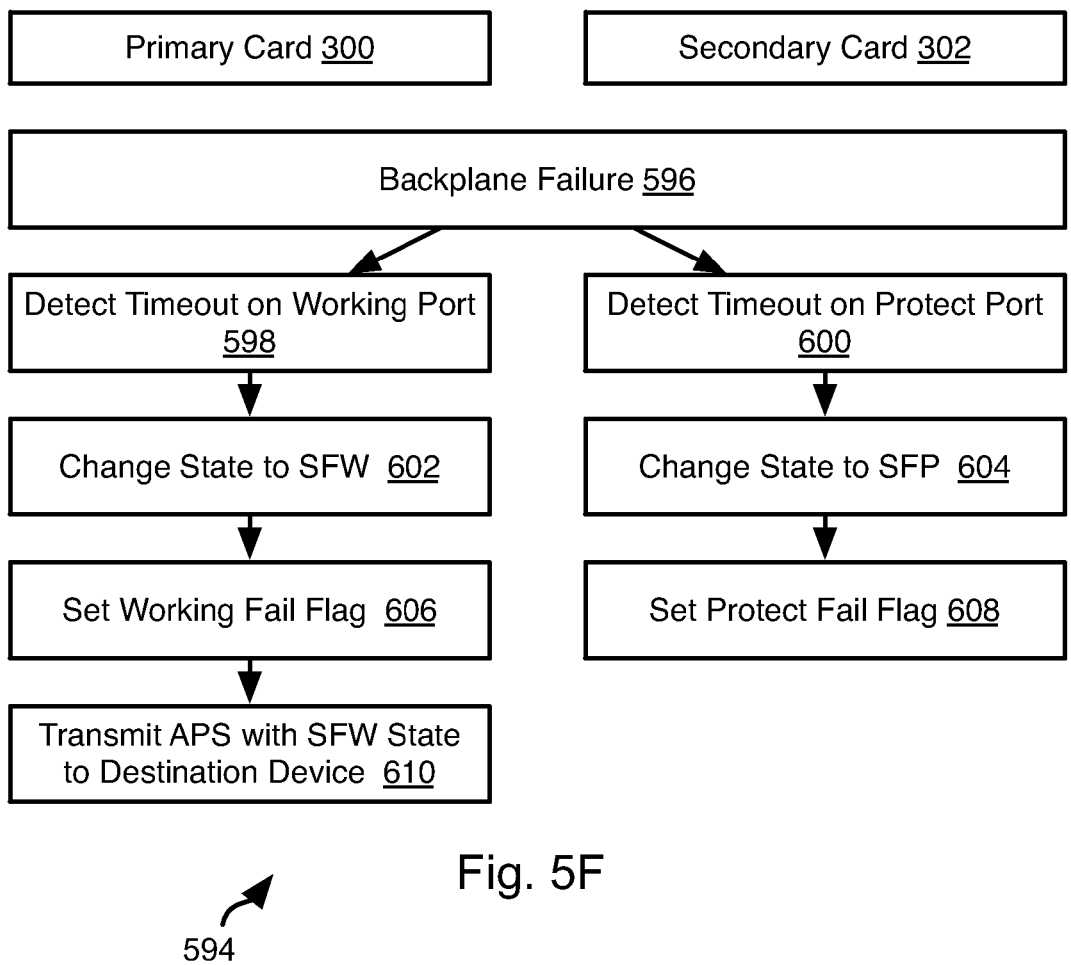

Referring to FIG. 5F, the inter-card path is implemented in some embodiments by the backplane 400 or some other network connection. For purposes of the discussion of FIG. 5F, the backplane 400 may be substituted with some other type of network connection. FIG. 5F illustrates a method 594 that may be performed in response to failure 596 of the backplane 400.

Inasmuch as the backplane 400 is part of the inter-card path, its failure will result in detection 598, 600 of timeout events by both of the primary card 300 and secondary card 302 inasmuch as CCM messages will cease between the MEPs 414a-414b.

In response to detecting 598 the timeout (an actual timeout condition in this case that does correspond to an actual error in the inter-card path), the primary card 300 changes 602 its state to SFW indicating that the protect path 204 is active and the working path 206 has failed. In response to detecting 600 the timeout on the inter-card path, the secondary card 602 changes 604 it state to SFP indicating that the working path 206 is active and the protect path 204 has failed. Likewise in response to detecting 598, 600 the timeout events the primary and secondary cards 300, 302 may set 606, 608 the working fail flag and protect fail flags, respectively.

As noted above, only one of the paths 204, 206 should be active at anyone time. However, inasmuch as the primary card 300 determines the active path APS messages transmitted by it to node B, either periodically or in response to detecting 598 the timeout, will indicate that the protect path 204 is the active path and the secondary card 302 will not transmit any such APS message, or will be superseded by APS messages sent by the primary card 300. Accordingly, only the protect path 204 will be viewed as active by node B and traffic will be properly routed.

The illustrated method 594 likewise illustrates what happens if either of the primary card 300 or secondary card 302 fails. In particular, if the primary card 300 fails, a timeout will be detected 600 and the corresponding steps 604 and 608 will be performed.

If the secondary card 302 fails, a timeout will be detected 598 and the corresponding steps 602, 606, 610 will be performed. APS messages from the primary card 300 will instruct node B that the protect path 204 is active and traffic will be routed accordingly without confusion.

The illustrated systems and methods advantageously enable the rapid switching between protect and working paths coupled to different cards. The switching is performed rapidly based on error messages or clearing of error messages. The use of primary and secondary state machines as described above ensures that only one path is active at a time but does so without requiring involvement of a higher protocol layer or software.

In some embodiments, the control module 520, or some other device or software implementing a higher protocol layer may monitor operation of the primary card 300, secondary card 302, states of the state machines 408, 410, status of the protect and working paths 204, 206. In particular, although the states of the primary card 300 and secondary card 302 may be determined by the cards themselves as described in FIGS. 5A through 5F. However, these states may be reported to the control module 520 and may be superseded by instructions form the control module 520 instructing the cards 300 to change the states of the state machines 408, 410.

For example, the card logic 404a, 404b may report the states of the state machines 408, 410 to the control module 520 or some other device or software module implementing a higher protocol layer. In particular, the states commanded by the card logic 404a for the secondary state machine 410 may invoke this reporting. For example, in one embodiment, the control module 520 may query the primary card 300. If no response is received, e.g. within a timeout period from the query, the control module 520 may query the secondary card 302. The primary card 300 may report one of the four states noted above (SFP, SFW, NRWS, NRWA). If primary card 300 fails, the secondary card 302 is queried and will report its state (SFP, SFW, NRWS). If the primary card 300 fails, the secondary card 302 will report SFP thereby informing the control module 520 of the issue. If no response is received from either card 300, 302, alerts may be generated by the control module 520. Likewise, if the backplane 400 fails, the control module 520 may detect this, such as by detecting the inconsistent SFP and SFW states of the state machines 408, 410. In response to this failure, the control module 520 may likewise generate an alert.

The control module 520 may process this information to implement an overall status of the redundant connection implemented by the cards 300, 302 and generate alarms based on detected failure of the cards 300, 302, backplane 400, paths 204, 206. In some embodiments, the control module 529 may further assign a card to be the primary card 300 or secondary card 302.

Figure 6:
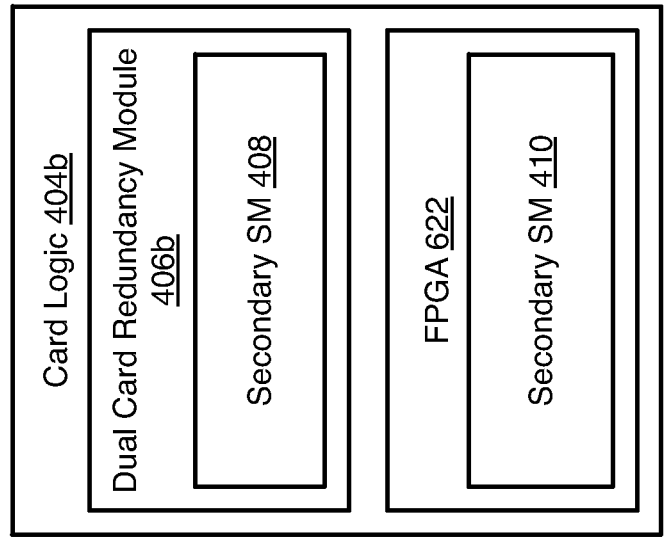
FIG. 6 is a schematic block diagrams of card logic in accordance with an embodiment of the present invention.
Figure 6:
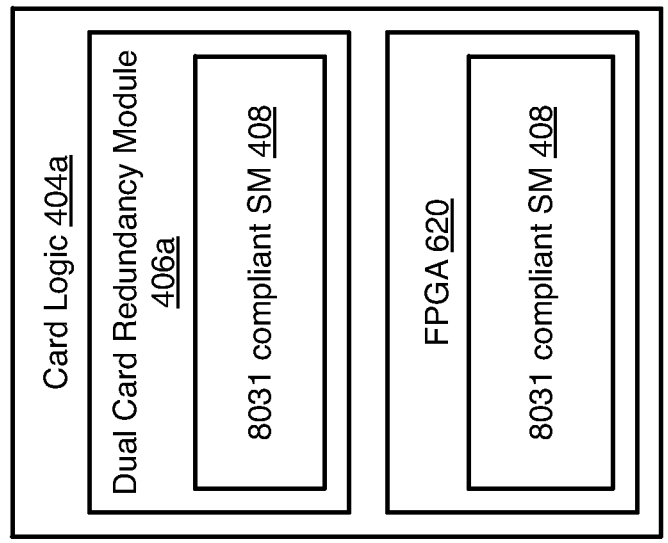

Referring to FIG. 6, in some embodiments card logic 404a, 404b may be implemented using both software executed by a processor and a FPGA (field programmable gate array) or other hardware device, such as an application specific integrated circuit. As shown, the card logic 404a may execute a dual card redundancy module 406a implemented in software executed by the primary card 300 and maintaining the state machine 408 in response to events and the status of the paths 204, 206 as described hereinabove.

Likewise, the card logic 404a may include an FPGA 620 that likewise implements a state machine 408 implementing the same states and state transitions in response to the same events and status of the paths 204, 206 as described above.

In a similar manner, card logic 404b may implement the dual card redundancy module 406b as software executed by the secondary card 302 and maintaining the secondary state machine 410 in response to events and the status of the paths 204, 206 as described hereinabove. The card logic 404b may include an FPGA 622 that implements a secondary state machine 410 implementing the same states and state transitions in response to the same events and status of the paths 204, 206 as described above.

Figure 7:
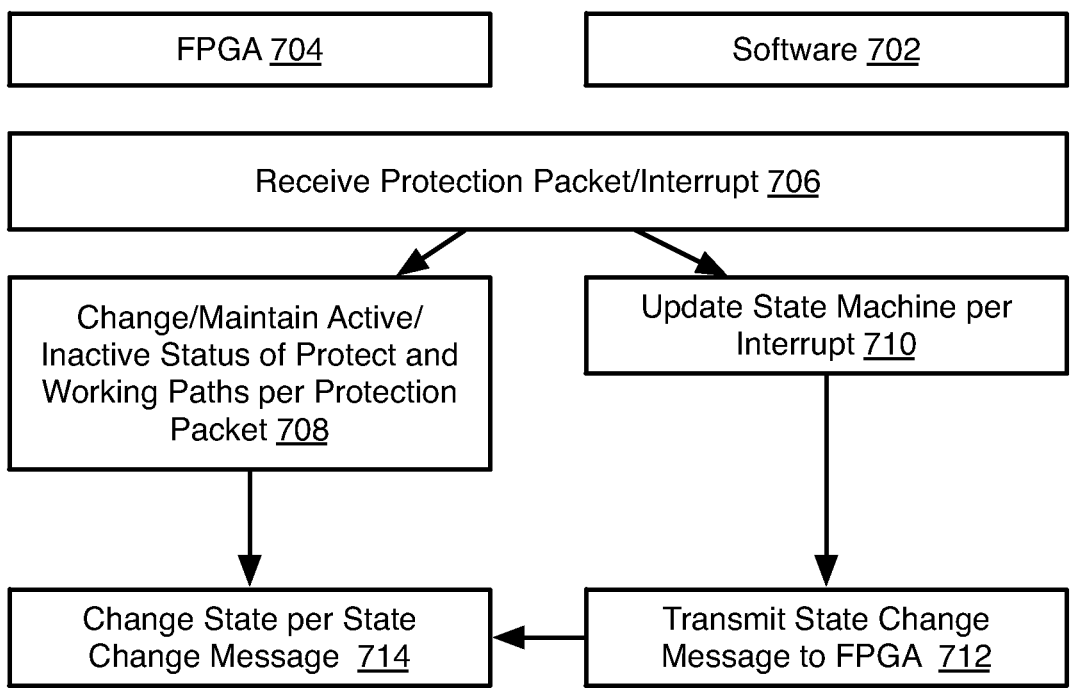
FIG. 7 is a process flow diagram of a method for implementing a dual-card redundancy system using an FPGA in accordance with an embodiment of the present invention.

Referring to FIG. 7, the dual card redundancy module 406a and FPGA 620 may interact according to the method 700. Likewise, the dual card redundancy module 406b may interact with the FPGA 622 according to the method 700 of FIG. 7. Stated differently, the software 702 of FIG. 7 may be embodied as either of the dual card redundancy modules 406a, 406b and the FPGA 704 may be embodied as the FPGA 620, 622 of the card executing the software 702.

The method 700 may include receiving 706 a protection packet by the FPGA 704 and an interrupt by the software 702 of a card. The protection packet and interrupt may be generated by hardware of the card. For example, the hardware of the card may generate a protection packet input to the FPGA 704 and an interrupt input to the software 702 in response to detecting of an error condition (RDI, timeout) by any of the MEPs 210a, 4114a, 214b, 414b of the card.

In response to receiving the protection packet, at step 708 the FPGA 704 either changes or maintains the current state of its state machine 408, 410 and which of the protect and working paths of the card is currently active according to the methods of some or all of FIGS. 5A through 5F. Specifically, the protection packet may indicate failure or return to operation of the protect or working paths of the card and the FPGA may make one of the protect and working paths active and/or generate an event or command (e.g. simulated error or clearing of an error) on the intercard path in response to the indication of failure or return to operation indicated by the protection packet as described above with respect to some or all of FIGS. 5A through 5F. However, the FPGA 704 refrains from changing the state of the state machine according to the protection packet until instructed to do so by the software 702, even where such a change in state is indicated according to the methods of FIGS. 5A through 5F.

Upon receiving the interrupt, the software updates 710 its state machine based on the current state of its state machine 408, 410 and the content of the interrupt, i.e. the failure or restoration of the working or protect path of the card indicated by the interrupt as described with respect to FIGS. 5A through 5F. The software 702 may not change which of the working and protect paths of the card is active inasmuch as this is performed by the FPGA 704 in response to the protection packet.

The software 702 further transmits 712 its updated state to the FPGA 704 of the card, which then changes 714 the state of its state machine 408, 410 to the updated state. As noted above, the FPGA 704 will have set the protect or working paths of the card as active or inactive according to the methods of FIGS. 5A through 5F in response to the protection packet. However, in the event that the updated state transmitted 712 by the software corresponds to different statuses of the working and protect paths, the FPGA 704 may change the statuses (active/inactive/down) of the working and protect paths to correspond to the updated state transmitted 712 by the software as dictated by the methods of FIGS. 5A through 5F.

The software 702 may have a much slower response time than the FPGA 704. Accordingly, the illustrated method 700 allows the FPGA 704 to quickly respond to a fault without waiting for the software 702, while still enabling the software 702 to be in control of the state and thereby enabling reporting of the state of the state machine 408, 410 of the card to the control module 520 and enabling explicit setting of the state of the state machine 408, 410 of the card, such as in response to an instruction received from the control module 520, the instruction being output by software executing in the control module 520 or in response to an instruction from an operator input to the control module 520.

If there one or more events (e.g. protection packets and/or interrupts) are received by the card between the point where the FPGA 704 switches the active path and the software 702 instructs it to change its state, the FPGA 704 may ignore these events. For example, upon receiving the protection packet, the FPGA 704 may start a hold off timer (such as defined in the 8031 standard). Events received prior to expiration of the hold off timer may be ignored.

In the event a protection packet is received after expiration of the hold off timer but before the software 704 instructs the FPGA 702 to update its state, an explicit instruction may be received from the control module 520, such as in response to an explicit user instruction received by the control module, instructing the FPGA 704 to transition to the state that the state machine 408, 410 of the card should be in as described with respect to the method of FIGS. 5A through 5F. Instructing the FPGA 704 to change the state of its state machine 408, 410 and its active path (working or protect) may include a manual switch, force switch, or forcing a fault that will cause the desired state change.

The present invention may be embodied in other specific forms without departing from its spirit or essential characteristics. The described embodiments are to be considered in all respects only as illustrative, and not restrictive. The scope of the invention is, therefore, indicated by the appended claims, rather than by the foregoing description. All changes which come within the meaning and range of equivalency of the claims are to be embraced within their scope.

Appendix: Example System Architecture

Glossary:

PSW: A type of packet line cards.
PME: A second type of packet line cards.
Eline: Ethernet line service (point-to-point service)
EVline: Ethernet virtual line service (point-to-point service differentiated by vlan)
Tesi: Traffic engineered service instance, basically a PBB tunnel that carries traffic from one end to the other end
MEP: Maintenance end point (These are used to monitor faults between two end points. Each end has a MEP)
UP MEP: Up Maintenance end point (Up and Down are the direction of MEP)
TLV: Type length value
CCM: Continuity check message (This is the message that MEP generates to monitor the path)
RDI: Remote defect indication (This is the indication transmitted in the CCMs when the MEP does not receive CCMs from the far end)
Flow Domain: the representation of a service on each node
APS: Automatic protection switching
APS Message: Automatic protection switching message

1. Purpose

Purpose of this document is to outline how the PSW will implement the G.8031, Linear Protection. This document will not cover the spec itself so details will not be here. The PSW will try and utilize as much of the work already done from the PME cards. The Idea will be to show how the PME has implemented certain features and describe how the PSW will accomplish the same behavior.

5.2 8031 Feature Requirement:
http://hq1.cyanoptics.com/trac/cyan/ticket/11283

Some more added detail on the requirement:
- Support ELine/EVline - When 8032 Client Ring is part of a Flow Domain then will always use a LAN Flow Domain for purposes of learning.
- Cross Card implementation shall be an any slot/port to any slot/port configuration.
- Only need to support Tesi Protection - this document will only cover Tesi Tunnel 1:1 Protection. At the time of writing this document it is believed that for 8031 and 8131 some terminology may be interchangeable because the switching/blocking are done on similar objects within the same hw device, but the encapsulation/decapsulation differs. Thus, a lot of this document can be related to the 8131 implementation.
- Fast switching will be handled by an FPGA see below doc for details on what FPGA will do:

○ FPGA 8031 Architecture

2. APS State Machine

The APS state machine will work as a single slot or as dual slot configuration. There are two different types of state machines; primary and secondary. As well as multiple levels for the state machine processing; fast path, slow path. The state machine will be running as a separate process in order to gain some priority with context switching of the threads. The 8031 and the 8032 threads will have the same scheduler priority, thus events by both process could reduce switchover times (except when running with FPGA).

- Primary will reside on the card which contains the protect path
- Secondary will only be present in a cross card scenario and will be present on the working path card.

If the configuration is dual slot, then MEPs will be created between a single port on either card. The MEP between the two ports will act as the working or protect path of the local card, this connection will be known as the intercard MEP. Thus, if local card has the protect path the intercard MEP will be working path, similarly if local card has the working path card the intercard MEP will be the protect path.

For the PME, the intercard MEP used the reserved TLV, port and interface in the CCM to indicate the status of its local path; link up or link down. The PSW Card does not support setting these TLV's thus the state machine will rely on Timeout and RDI events on the intercard MEPs to determine faults

2.1 Primary State Machine

The primary will make all the switching decisions based on the 8031 spec state transitions. The Primary state machine will inform the secondary state machine what actions to perform during the different state transitions.

2.2 Secondary State Machine

The secondary will act as a reporter of its local path state. It will not tell the primary to perform any actions.

The only action the secondary state machine may make is to inform primary when link is in a fault state when its path is active.

2.3 Fast Path vs Slow Path

The difference between the fast path and slow path state machine is just that one is meant for fast operations, such as fast switching. The fast path may be instrumented making a call to the Arad to actually perform the protection switch, or if the FPGA implementation active then it will be a call to sync the correct action with the FPGA state. The software is always the primary controller for the FPGA.

The slow path is meant for slower operation on the state machine, such as initiating user commands, state transition changes and relaying alarms to mplane.

2.4 PME Intercard MEP - CCM

The intercard MEP will be a DOWN MEP, because the PME cards do not support UP MEPs on a Tunnel. The PME will then require a couple of rules to process the CCMs.

1. CCMs will be generated from the local card toward an internal loopback port. In order for the packet to not be captured by the MEP the outer vlan needs to be modified.
2. CCMs from remote card will need to be redirected to an internal loopback port and the outer vlan in the frame will then need to be translated to the MEP_VLAN.

2.5 PSW Intercard MEP

The intercard MEP will be an UP MEP on an internal port (should not be in loopback). The MEP will be a double tagged MEP so that it will not conflict with any other MEPs used on the port.

MEP and AC-LIF Double Tag Vlan Format:
Outer Tag - Protect Port | Protect Slot << 8
Inner Tag  - Protect BVID
MepId - working is local 1, protect is local 2
MaId -

2.5.1 Intercard MEP States - Primary State Machine

The primary state machine will use the *timeout* and *timein* interrupts to relay switchover states. A timeout on the secondary state machine is generated by the primary by turning CCM's off.

When the primary state machine receives a *timeout* and its local path was not active it will go active (given all other 8031 states are ok).

2.5.2 Intercard MEP States - Secondary State Machine

The secondary state machine will only send *timeout* when his local path is in *timeout/RDI*.

When the secondary state machine receives a *timeout* and its local path was not a active it will go active (given all other 8032 states are ok). When a *timein* is received the local path should go standby.

2.5.3 Fabric Faults

At the time of this document there is no solution for a fabric fault causing a *timeout*, reason being is that a fabric pull should result in less than 9.9ms loss. Which means that 3 consecutive CCMs' should not be lost. If all fabrics links are lost then a *timeout* will be received by both the primary and secondary intercard meps, normal timeout event processing should occur, basically both links should go active (given all other 8032 states are ok). The reason we want both links to go active is if the UNI link is on the same card then it will still pass traffic.

2.6 Aps Messaging

The standard states that the APS Messages shall be transmitted on the protect path. If the working path is on another card It will be the job of the Protect State Machine to relay what action to take on the working card.

However, due to the nature of our distributed system a proprietary switchover APS message must be sent to all cards. Reason being is the switching is done on the ingress card, which may not reside on the same card as the local protection objects. An FPGA will be used to generate the message, but due to time constraints the aps software will also implement this functionality. The primary state machine will send a message to the ingress card which will cause will trigger the switch. In the case of the FPGA it will broadcast the message and perform the same action on all cards.

3. Services 8031 is most commonly used in conjunction with a Point to Point service (P2P). The PSW allows us to create a P2P service without create a bridge.

What is claimed is:

1. A node in an Ethernet network, the node comprising:
a working port forming a working path in the Ethernet network;
a protect port forming a protect path in the Ethernet network;
an inter-card path between the working port and the protect port for routing traffic there between; and
a control module communicatively coupled to the working port and the protect port and comprising a processing apparatus configured to
manage state machines associated with the working port and the protect port to invoke changes therein in response to a plurality operating conditions on the working path and the protect path, and
message simulated events through a transmission on the inter-card path based on a specific operating condition of the plurality of operating conditions, wherein the simulated events comprise one of simulated error conditions and simulated clearing of error conditions,
wherein the working path is a default path, and wherein the specific operating condition comprises a restoration on the working path, and wherein the simulated events comprise a simulated error invoked on the inter-card path that does not correspond to any actual error on the inter-card path, to cause the working path to become active.

2. The node of claim 1, wherein the specific operating condition comprises a failure on the working path, and wherein the simulated events comprise a simulated error invoked on the inter-card path that does not correspond to any actual error on the inter-card path.

3. The node of claim 2, wherein the message comprises a Remote Defect Indicator (RDI) inserted in a Continuity Check Message (CCM) packet over the inter-card path.

4. The node of claim 1, wherein the specific operating condition comprises a restoration on the working path, and wherein the simulated events comprise a simulated clear invoked on the inter-card path that does not correspond to any actual clearing on the inter-card path.

5. The node of claim 4, wherein the message comprises a Remote Defect Indicator (RDI) clear inserted in a Continuity Check Message (CCM) packet over the inter-card path.

6. The node of claim 1, wherein inter-card path is over a backplane where the working port is on a first card and the protect port is on a second card.

7. The node of claim 1, wherein the state machines operate according G.8031 protocol.

8. A method in a node in an Ethernet network, the method comprising:
operating a working path formed by a working path in the Ethernet network;
operating a protect path formed by a protect path in the Ethernet network;
messaging via an inter-card path between the working port and the protect port for routing traffic there between;
managing state machines associated with the working port and the protect port to invoke changes therein in response to a plurality operating conditions on the working path and the protect path; and
messaging simulated events through a transmission on the inter-card path based on a specific operating condition of the plurality of operating conditions, wherein the simulated events comprise one of simulated error conditions and simulated clearing of error conditions,
wherein the working path is a default path, and wherein the specific operating condition comprises a restoration on the working path, and wherein the simulated events comprise a simulated error invoked on the inter-card path that does not correspond to any actual error on the inter-card path, to cause the working path to become active.

9. The method of claim 8, wherein the specific operating condition comprises a failure on the working path, and wherein the simulated events comprise a simulated error invoked on the inter-card path that does not correspond to any actual error on the inter-card path.

10. The method of claim 9, wherein the message comprises a Remote Defect Indicator (RDI) inserted in a Continuity Check Message (CCM) packet over the inter-card path.

11. The method of claim 8, wherein the specific operating condition comprises a restoration on the working path, and wherein the simulated events comprise a simulated clear invoked on the inter-card path that does not correspond to any actual clearing on the inter-card path.

12. The method of claim 11, wherein the message comprises a Remote Defect Indicator (RDI) clear inserted in a Continuity Check Message (CCM) packet over the inter-card path.

13. The method of claim 8, wherein inter-card path is over a backplane where the working port is on a first card and the protect port is on a second card.

14. The method of claim 8, wherein the state machines operate according G.8031 protocol.

15. A control module associated with a node in an Ethernet network, the node comprising:
connections to a working port forming a working path in the Ethernet network and a protect port forming a protect path in the Ethernet network, wherein an inter-card path is between the working port and the protect port for routing traffic there between; and
a processing apparatus configured to
manage state machines associated with the working port and the protect port to invoke changes therein in response to a plurality operating conditions on the working path and the protect path, and
message simulated events through a transmission on the inter-card path based on a specific operating condition of the plurality of operating conditions, wherein the simulated events comprise one of simulated error conditions and simulated clearing of error conditions,
wherein the working path is a default path, and wherein the specific operating condition comprises a restoration on the working path, and wherein the simulated events comprise a simulated error invoked on the inter-card path that does not correspond to any actual error on the inter-card path, to cause the working path to become active.

16. The control module of claim 15, wherein the specific operating condition comprises a failure on the working path, and wherein the simulated events comprise a simulated error invoked on the inter-card path that does not correspond to any actual error on the inter-card path.

17. The control module of claim 15, wherein the specific operating condition comprises a restoration on the working path, and wherein the simulated events comprise a simulated clear invoked on the inter-card path that does not correspond to any actual clearing on the inter-card path.

* * * * *